US010976956B2

(12) United States Patent
Lu et al.

(10) Patent No.: US 10,976,956 B2
(45) Date of Patent: Apr. 13, 2021

(54) NON-VOLATILE MEMORY PERSISTENCE METHOD AND COMPUTING DEVICE

(71) Applicant: HUAWEI TECHNOLOGIES CO., LTD., Guangdong (CN)

(72) Inventors: Tianyue Lu, Beijing (CN); Mingyu Chen, Beijing (CN); Yuan Ruan, Beijing (CN); Wei Yang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/366,325

(22) Filed: Mar. 27, 2019

(65) Prior Publication Data

US 2019/0220224 A1 Jul. 18, 2019

Related U.S. Application Data

(63) Continuation of application No. PCT/CN2017/104743, filed on Sep. 30, 2017.

(30) Foreign Application Priority Data

Sep. 30, 2016 (CN) .......................... 201610878743.8

(51) Int. Cl.
*G06F 3/06* (2006.01)
*G06F 12/0873* (2016.01)
(Continued)

(52) U.S. Cl.
CPC ............ *G06F 3/0656* (2013.01); *G06F 3/061* (2013.01); *G06F 3/0637* (2013.01);
(Continued)

(58) Field of Classification Search
CPC ........ G06F 13/14; G06F 3/0653; G06F 3/061; G06F 3/0659; G06F 3/0679;
(Continued)

(56) References Cited

U.S. PATENT DOCUMENTS

| 6,289,386 B1 | 9/2001 | Vangemert |
| 7,103,672 B1 | 9/2006 | Sharma |

(Continued)

FOREIGN PATENT DOCUMENTS

| CN | 1407768 A | 4/2003 |
| CN | 1434454 A | 8/2003 |

(Continued)

OTHER PUBLICATIONS

Jishen Zhao et al. FIRM: Fair and High-Performance Memory Control for Persistent Memory Systems, Dec. 13-17, 2014. 13 pages.

(Continued)

*Primary Examiner* — Hashem Farrokh
(74) *Attorney, Agent, or Firm* — Leydig, Voit & Mayer, Ltd.

(57) ABSTRACT

In a non-volatile memory (NVM) persistence method, a memory controller maintains a plurality of memory write instruction sets that are locked separately for persistence of write operations. A credit value for monitoring a quantity of completed write instructions is configured for each of the plurality of memory write instruction sets, and a credit value is also configured for each of a plurality of medium write instruction sets maintained by a medium controller and corresponding respectively to the memory write instruction sets. After a memory write instruction set is locked in response to a persistence query, the credit value of a corresponding medium write instruction set is used as means for the memory controller to determine whether the write instructions in the locked memory write instruction set have been completed by the medium controller.

12 Claims, 7 Drawing Sheets

(51) Int. Cl.
*G06F 16/903* (2019.01)
*G06F 13/14* (2006.01)
*H04L 12/801* (2013.01)

(52) U.S. Cl.
CPC .......... *G06F 3/0653* (2013.01); *G06F 3/0659* (2013.01); *G06F 3/0679* (2013.01); *G06F 12/0873* (2013.01); *G06F 13/14* (2013.01); *G06F 16/903* (2019.01); *H04L 47/39* (2013.01); *G06F 3/0619* (2013.01)

(58) Field of Classification Search
CPC .... G06F 3/0637; G06F 3/0656; G06F 3/0619; G06F 12/0873; G06F 16/903; H04L 47/39
USPC .......................................................... 711/103
See application file for complete search history.

(56) References Cited

U.S. PATENT DOCUMENTS

| | | | |
|---|---|---|---|
| 7,702,871 | B1 | 4/2010 | Arnon et al. |
| 2006/0133154 | A1 | 6/2006 | Enomoto |
| 2006/0282573 | A1 | 12/2006 | Maeda et al. |
| 2012/0311236 | A1* | 12/2012 | Ohshima ............... G06F 3/0658 711/103 |
| 2014/0052938 | A1 | 2/2014 | Kim et al. |
| 2014/0082268 | A1 | 3/2014 | Kim |
| 2015/0006834 | A1 | 1/2015 | Dulloor et al. |
| 2015/0149735 | A1 | 5/2015 | Nale et al. |
| 2016/0092223 | A1* | 3/2016 | Wang ..................... G06F 9/3004 712/208 |
| 2016/0103729 | A1 | 4/2016 | Palframan et al. |
| 2016/0139807 | A1* | 5/2016 | Lesartre ................ G06F 3/0688 711/154 |
| 2016/0188456 | A1 | 6/2016 | Blagodurov et al. |
| 2016/0211973 | A1 | 7/2016 | Nale et al. |
| 2017/0097795 | A1* | 4/2017 | Nishina ............... G06F 12/0246 |
| 2018/0059966 | A1* | 3/2018 | Lee ....................... G06F 3/0685 |

FOREIGN PATENT DOCUMENTS

| | | |
|---|---|---|
| CN | 1790293 A | 6/2006 |
| CN | 101082852 A | 12/2007 |
| CN | 101801061 A | 8/2010 |
| CN | 103268291 A | 8/2013 |
| CN | 103309605 A | 9/2013 |
| CN | 103678193 A | 3/2014 |
| CN | 104079502 A | 10/2014 |
| CN | 104239252 A | 12/2014 |
| CN | 104881371 A | 9/2015 |
| CN | 104981872 A | 10/2015 |
| CN | 105340017 A | 2/2016 |
| CN | 105446899 A | 3/2016 |
| CN | 105814544 A | 7/2016 |
| CN | 110088740 A | 8/2019 |
| JP | 2002026968 A | 1/2002 |
| JP | 2003067318 A | 3/2003 |
| JP | 2006309579 A | 11/2006 |
| JP | 2008547089 A | 12/2008 |
| JP | 2014230072 A | 12/2014 |
| JP | 2016018382 A | 2/2016 |
| JP | 2016514320 A | 5/2016 |
| WO | 2014143056 A1 | 9/2014 |
| WO | 2016105814 A1 | 6/2016 |
| WO | 2016118624 A1 | 7/2016 |

OTHER PUBLICATIONS

Steven Pelley et al. Memory Persistency, 2014 IEEE. Total 14 pages.
Michael Agun et al. Approaches for Implementing Persistent Queues within Data-Intensive Scientific Workflows, 2011 IEEE World Congress on Services. pp. 200-207.
Hu Wan et al. Empirical Study of Redo and Undo Logging in Persistent Memory, 2016 5th Non-Volatile Memory Systems and Applications Symposium (NVMSA). Aug. 2016. total 6 pages.
Gaku Nakagawa et al. NVM/DRAM Hybrid Memory Management with Language Runtime Support via MRW Queue, IEEE, SNPD 2015, Jun. 1-3 2015, Takamatsu, Japan. Total 6 pages.
Youyou Lu et al. Blurred Persistence in Transactional Persistent Memory, 2015 IEEE. Total 13 pages.
Youyou Lu et al. Loose-Ordering Consistency for Persistent Memory, 2014 IEEE. pp. 216-223.
Ellis R. Giles et al. SoftWrAP: A lightweight framework for transactional support of storage class memory, 2015 31st Symposium on Mass Storage Systems and Technologies (MSST), Date of Conference: May 30-Jun. 5, 2015. XP033196397, total 14 pages.

* cited by examiner

NON-VOLATILE MEMORY PERSISTENCE METHOD AND COMPUTING DEVICE

CROSS-REFERENCE TO RELATED APPLICATIONS

This application is a continuation of International Application No. PCT/CN2017/104743, filed on Sep. 30, 2017, which claims priority to Chinese Patent Application No. 201610878743.8, filed on Sep. 30, 2016. The disclosures of the aforementioned applications are hereby incorporated by reference in their entireties.

TECHNICAL FIELD

The present invention relates to the computer field, and in particular, to a non-volatile memory (NVM) persistence method and a computing device.

BACKGROUND

Data persistence indicates that data that has been successfully written into a persistent non-volatile memory NVM is not lost even when a system crash or a power failure occurs. For example, when data of an application program has a persistence attribute, the application program can be restored, based on data stored in an NVM, to a normal running state after a system crash or a power failure occurs. In current application, an NVM is usually used as a memory, so that running of an application program can be directly restored from the memory after a system crash or a power failure occurs. However, when the NVM is used as a memory, an existing double data rate (DDR) memory protocol cannot support data persistence confirmation. The reason is that in the existing DDR memory protocol, a write instruction is committed immediately after data is written into a central processing unit (CPU) cache, and the CPU and the application program cannot continue to track and learn whether data of the write instruction is really written into the memory.

To determine whether the data of the write instruction is written into the memory, a persistence confirmation solution is currently proposed, that is, a PCOMMIT instruction and a CLFLUSH instruction are used to implement persistence confirmation. The CLFLUSH instruction can be used to write back data specified in the CPU cache, and a write instruction is generated and sent to a memory controller. With the PCOMMIT instruction, all write instructions in the memory controller are forcibly written into the memory. In an execution process of the PCOMMIT instruction, the memory controller keeps blocking a new write instruction that is to enter the memory controller, until all the write instructions in the memory controller are sent to a memory chip. According to the foregoing method, it can be confirmed that the data is successfully written into the memory and persistence of the data is completed.

In the current persistence confirmation solution, the PCOMMIT instruction is used to instruct a persistence operation to be completed on all the write instructions in the memory controller. In the execution process of the PCOMMIT instruction, all write instructions to enter the memory controller are blocked. This reduces new write instructions sent to the memory controller, to avoid affecting execution of the PCOMMIT instruction. However, write instructions of all application programs cannot be sent to the memory controller for the moment while the foregoing effect is achieved. Therefore, an application program that invokes the PCOMMIT instruction greatly affects performance of other application programs, and overall system running efficiency becomes low.

SUMMARY

Embodiments of the present invention are to provide an NVM persistence method and a computing device. A plurality of memory write instruction sets are set, so that local blocking is implemented on a minimum granularity basis of per memory write instruction set, thereby improving parallel processing efficiency of a memory controller.

According to a first aspect, this application provides a non-volatile memory NVM persistence method.

A memory controller is associated with at least two memory write instruction sets, and the at least two memory write instruction sets may be set in the memory controller. For example, the at least two memory write instruction sets are located in buffer space of the memory controller. A credit value is configured for each of the at least two memory write instruction sets, and the credit value indicates a quantity of write instructions allowed to enter the memory write instruction set. When a credit value of a memory write instruction set is equal to 0, no write instruction is allowed to enter the memory write instruction set, and each memory write instruction set has a maximum credit value.

An NVM is a memory that can still retain data after a power failure occurs, and the NVM includes but is not limited to a read-only memory (ROM), a programmable read-only memory (PROM), an electrically alterable read-only memory (EAROM), an erasable programmable read-only memory (EPROM), an electrically erasable programmable read-only memory (EEPROM), or a flash memory. A medium controller of the NVM is associated with at least two medium write instruction sets, and the at least two medium write instruction sets may be set in the medium controller. For example, the at least two medium write instruction sets are located in buffer space of the medium controller. A credit value is configured for each of the at least two medium write instruction sets, and the credit value indicates a quantity of write instructions allowed to enter the medium write instruction set. When a credit value of a medium write instruction set is equal to 0, no write instruction is allowed to enter the medium write instruction set, and each medium write instruction set has a maximum credit value. A data structure of the memory write instruction set and the medium write instruction set may be a queue, an array, a linked list, a stack, or the like. This is not limited in this application.

A quantity of memory write instruction sets in the at least two memory write instruction sets is equal to a quantity of medium write instruction sets in the at least two medium write instruction sets, the at least two memory write instruction sets and the at least two medium write instruction sets have a one-to-one mapping relationship, and maximum credit values of a memory write instruction set and a medium write instruction set that are associated with each other are equal.

The persistence method in this application is applied to a process of writing to-be-written data in a memory into the NVM, and includes: A memory controller first receives a write instruction, where the write instruction includes a write address of the to-be-written data, and the write instruction may be sent by a processor; the memory controller determines a target memory write instruction set from at least two memory write instruction sets based on the write address, and stores the write instruction into the selected target memory write instruction set, where the target memory write instruction set is one of the at least two memory write instruction sets; and the memory controller decreases a credit value of the target memory write instruction set by a specified value, where the specified value is a preset value, and a specific value of the specified value is not limited.

The memory controller may select the target memory write instruction set from the at least two memory write instruction sets according to a preset selection rule, fetch the write instruction from the target memory write instruction set, and send the fetched write instruction to a medium controller.

The medium controller receives the write instruction, and determines a target medium write instruction set from the at least two medium write instruction sets based on the write address, where the target medium write instruction set and the target memory write instruction set have a binding relationship, and the target medium write instruction set is one of the at least two medium write instruction sets; and the medium controller stores the write instruction into the target medium write instruction set, and decreases a credit value of the target medium write instruction set by the specified value.

The medium controller may select the target medium write instruction set from the at least two medium write instruction sets according to a preset selection rule, and fetch the write instruction from the target medium write instruction set.

The medium controller obtains the write address carried in the write instruction, queries, based on a preset address mapping table, for a physical block address that is of the NVM and that is associated with the write address, and writes the to-be-written data corresponding to the write instruction into a physical block corresponding to the physical block address; and if no physical block address is found in the address mapping table, that is, if no physical block address is allocated, the medium controller selects a physical block from a free physical block list for allocation, and establishes, in the address mapping table, a mapping relationship between a physical block address of the selected physical block and the write address.

After determining that the to-be-written data is successfully written into the NVM, the medium controller increases the credit value of the target medium write instruction set by the specified value, and the medium controller sends the credit value of the target medium write instruction set to the memory controller, so that the credit value of the target memory write instruction set and the credit value of the target medium write instruction set are kept synchronized.

In the foregoing embodiment, credit values respectively corresponding to the plurality of specified memory write instruction sets are kept synchronized with credit values respectively corresponding to the plurality of specified medium write instruction sets in the medium controller. The medium controller can determine an execution status of the write instruction based on the credit value of each medium write instruction set, and therefore after the credit values of the memory controller and the medium controller are kept synchronized, whether persistence of the write instruction is completed can be accurately found based on the credit values. In addition, setting the plurality of memory write instruction sets can implement local blocking at a granularity of a memory write instruction set during the persistence query, to improve parallel processing efficiency of the memory controller.

In a possible implementation of this aspect, a total address section of the NVM is divided into a plurality of non-overlapping address sections in advance, an address section of the NVM is configured for each of the at least two memory write instruction sets, and each of the at least two memory write instruction sets has a different address section. That the memory controller determines a target memory write instruction set from at least two memory write instruction sets based on the write address, stores the write instruction into the target memory write instruction set, and decreases a credit value of the target memory write instruction set by a specified value includes: determining, by the memory controller, a target address section in which the write address carried in the write instruction is located, where the target address section is one of address sections that are respectively pre-configured for the at least two memory write instruction sets; using a memory write instruction set associated with the target address section as the target memory write instruction set, where the specified value is 1; and storing, by the memory controller, the write instruction into the target memory write instruction set, and decreasing the credit value of the target memory write instruction set by 1. In the foregoing embodiment, the target memory write instruction set is determined based on the address section in which the write address is located, so that the write instruction can be quickly and accurately stored, thereby improving processing efficiency.

In a possible implementation of this aspect, the total address section of the NVM is divided into the plurality of non-overlapping address sections in advance, a quantity of the address sections is equal to the quantity of the medium write instruction sets in the at least two medium write instruction sets, and a different address section is configured for each of the at least two medium write instruction sets. That the medium controller determines a target medium write instruction set from the at least two medium write instruction sets based on the write address, stores the write instruction into the target medium write instruction set, and decreases a credit value of the target medium write instruction set by a specified value includes: obtaining, by the medium controller, the write address carried in the write instruction, and determining the target address section in which the write address is located, where the target address section is one of address sections respectively configured for the at least two medium write instruction sets; and storing, by the medium controller, the write instruction into the target medium write instruction set. For example, if a data structure of the target medium write instruction set is a queue, the medium controller stores the write instruction at the tail of the queue. For another example, if a data structure of the target medium write instruction set is a stack, the medium controller stores the write instruction at the top of the stack. If a preset specified value is 1, after storing the write instruction, the medium controller decreases the credit value of the target medium write instruction set by 1. In the foregoing embodiment, the target medium write instruction set is determined by using the target address section within which the write address falls, so that the write instruction can be quickly and accurately stored, thereby improving processing efficiency.

In a possible implementation of this aspect, if the preset specified value is 1, after determining the target memory write instruction set, the memory controller obtains a current credit value of the target memory write instruction set; determines whether the current credit value is greater than 0; and if a determining result is that the current credit value is greater than 0, stores the write instruction into the target memory write instruction set; or if the determining result is that the current credit value is not greater than 0, caches the write instruction, queries for a credit value of the target memory write instruction set based on a preset period, and when finding that the credit value of the target memory write instruction set is greater than 0, stores the cached write instruction into the target memory write instruction set. In the foregoing embodiment, a quantity of write instructions that enter the memory controller is controlled by using the credit value, to avoid overload caused because the memory controller cannot process the write instructions in a timely manner.

In a possible implementation of this aspect, after determining the target medium write instruction set, the medium controller obtains a current credit value of the target medium write instruction set; determines whether the current credit value is greater than 0; and if a determining result is that the current credit value is greater than 0, stores the write instruction into the target medium write instruction set; or if the determining result is that the current credit value is not greater than 0, caches the write instruction, queries for a credit value of the target medium write instruction set based on the preset period, and when finding that the credit value of the target medium write instruction set is greater than 0, stores the cached write instruction into the target medium write instruction set. In the foregoing embodiment, a quantity of write instructions that enter the medium controller is controlled by using the credit value, to avoid overload caused because the medium controller cannot process the write instructions in a timely manner.

In a possible implementation of this aspect, before the memory controller receives the write instruction that carries the write address, the method further includes: dividing the total address section of the NVM into the plurality of non-overlapping address sections in advance, where the quantity of the address sections is equal to a quantity of the memory write instruction sets, and the quantity of the memory write instruction sets is equal to a quantity of medium write instruction sets. The memory controller configures, by invoking a library function, the address section of each of the at least two memory write instruction sets, where each memory write instruction set has a different address section; and the memory controller configures the address section of each of the at least two medium write instruction sets, where each medium write instruction set has a different address section, and a memory write instruction set and a medium write instruction set that have a binding relationship have a same address section. In the foregoing embodiment, the address sections of the at least two memory write instruction sets and the at least two medium write instruction sets are configured by invoking the library function, so that the target memory write instruction set and the target medium write instruction set are determined based on the write address of the write instruction.

In a possible implementation of this aspect, that the medium controller sends the credit value of the target medium write instruction set to the memory controller includes: receiving, by the medium controller, a query request sent by the memory controller, where the query request is used to query the credit value of the target medium write instruction set. The medium controller may store the credit value of the target medium write instruction set in a register, and when finding that the credit value of the target medium write instruction set is updated, the medium controller immediately updates the credit value that is of the target medium write instruction set and that is stored in the register. The memory controller may directly query the register about the credit value of the target medium write instruction set. After receiving the query request, the medium controller sends, to the memory controller, a query response that carries the credit value of the target medium write instruction set.

In a possible implementation of this aspect, that the medium controller sends the credit value of the target medium write instruction set to the memory controller includes: actively sending, by the medium controller, the credit value of the target medium write instruction set periodically to the memory controller.

In a possible implementation of this aspect, the method further includes: receiving, by the memory controller, a persistence query instruction for the target memory write instruction set, and obtaining a receiving moment of the persistence query instruction; blocking, by the memory controller, a write instruction that is to enter the target memory write instruction set after the receiving moment; reading, by the memory controller, the credit value of the target memory write instruction set; and if the read credit value is equal to a preset maximum value, determining, by the memory controller, that persistence of the write instruction in the target memory write instruction set is completed. In the foregoing embodiment, the memory controller receives the persistence query instruction, and needs to block only a memory write instruction set to be queried, without a need to block another memory write instruction set, so that local blocking at a granularity of a memory write instruction set is implemented, to improve parallel processing efficiency of the memory controller.

In a possible implementation of this aspect, that the memory controller blocks a write instruction that is to enter the target memory write instruction set after the receiving moment includes: caching the write instruction that is to enter the target memory write instruction set after the receiving moment; or adding, by the memory controller, a software mutex to the target memory write instruction set at the receiving moment.

In a possible implementation of this aspect, the method further includes: receiving, by the medium controller, a persistence query instruction for the target medium write instruction set; reading, by the medium controller, the credit value of the target medium write instruction set; and if the read credit value is equal to the preset maximum value, determining, by the medium controller, that a persistence operation of the write instruction in the target medium write instruction set is completed. In the foregoing embodiment, the medium controller receives the persistence query instruction, and needs to block only a medium write instruction set to be queried, without a need to block another medium write instruction set, so that local blocking at a granularity of a memory write instruction set is implemented, to improve parallel processing efficiency of the memory controller.

According to a second aspect, this application further provides a computing device, where the computing device includes a memory controller, a medium controller, and a non-volatile memory NVM, and the computing device includes but is not limited to a data center server, a network server, a video server, a workstation, a personal computer, or the like. The memory controller includes buffer space, where the buffer space is used to store at least two memory write instruction sets, and a credit value is configured for each of the at least two memory write instruction sets; and the medium controller includes buffer space, where the buffer space is used to store at least two medium write instruction sets, the medium controller is associated with the at least two medium write instruction sets, and a credit value is configured for each of the at least two medium write instruction sets. A data structure of the memory write instruction set and the medium write instruction set may be a queue, an array, a stack, a linked list, or the like. This is not limited in this application. A quantity of memory write instruction sets in the at least two memory write instruction sets may be equal to a quantity of medium write instruction sets in the at least two medium write instruction sets, the at least two memory write instruction sets and the at least two medium write instruction sets have a one-to-one mapping relationship, and credit values of a memory write instruction set and a medium write instruction set that have an association relationship are equal.

The memory controller is configured to:

receive a write instruction, where the write instruction includes a write address of to-be-written data;

select, based on the write address, a target memory write instruction set from the at least two memory write instruction sets stored in the buffer space of the memory controller, store the write instruction into the target memory write instruction set, and decrease a credit value of the target memory write instruction set by a specified value;

send the write instruction in the target memory write instruction set to the medium controller;

receive a credit value that is of a target medium write instruction set and that is sent by the medium controller; and update the credit value of the target memory write instruction set based on the credit value of the target medium write instruction set.

The medium controller is configured to:

receive the write instruction sent by the memory controller;

determine, based on the write address, the target medium write instruction set from the at least two medium write instruction sets stored in the buffer space of the medium controller;

store the write instruction into the target medium write instruction set, and decrease the credit value of the target medium write instruction set by the specified value;

send the write instruction in the target medium write instruction set to the NVM, and after the NVM successfully executes the write instruction, increase the credit value of the target medium write instruction set by the specified value; and send the credit value of the target medium write instruction set to the memory controller.

In the foregoing embodiment, credit values respectively corresponding to the plurality of specified memory write instruction sets are kept synchronized with credit values respectively corresponding to the plurality of specified medium write instruction sets. The medium controller can determine an execution status of the write instruction based on the credit value of each medium write instruction set, and therefore after the credit values of the memory controller and the medium controller are kept synchronized, whether persistence of the write instruction is completed can be accurately found based on the credit values. In addition, setting the plurality of memory write instruction sets can implement local blocking at a granularity of a memory write instruction set during the persistence query, to improve parallel processing efficiency of the memory controller.

In a possible implementation of this aspect, the memory controller further includes a receiver, a cache controller, a plurality of counters, and a transmitter, and one counter is configured for each memory write instruction set; and the medium controller further includes a receiver, a cache controller, a plurality of counters, and a transmitter, and one counter is configured for each medium write instruction set, where the receiver of the memory controller is configured to receive the write instruction that carries the write address;

the cache controller of the memory controller is configured to: select, based on the write address, the target memory write instruction set from the at least two memory write instruction sets stored in the buffer space of the memory controller, store the write instruction into the target memory write instruction set, and instruct a counter corresponding to the target memory write instruction set to decrease the credit value of the target memory write instruction set by the specified value;

the transmitter of the memory controller is configured to send the write instruction in the target memory write instruction set to the receiver of the medium controller;

the receiver of the memory controller is further configured to receive the credit value that is of the target medium write instruction set and that is sent by the transmitter of the medium controller;

the cache controller of the memory controller is further configured to instruct a counter corresponding to the memory controller to update the credit value of the target memory write instruction set based on the credit value of the target medium write instruction set;

the receiver of the medium controller is configured to receive the write instruction sent by the transmitter of the memory controller;

the cache controller of the medium controller is configured to: determine, based on the write address, the target medium write instruction set from the at least two medium write instruction sets stored in the buffer space of the medium controller, store the write instruction into the target medium write instruction set, and instruct a counter corresponding to the target medium write instruction set to decrease the credit value of the target medium write instruction set by the specified value;

the transmitter of the medium controller is configured to send the write instruction in the target medium write instruction set to the NVM;

the cache controller of the medium controller is further configured to: after the NVM successfully executes the write instruction, instruct the counter corresponding to the target medium write instruction set to increase the credit value of the target medium write instruction set by the specified value; and the transmitter of the medium controller is further configured to send the credit value of the target medium write instruction set to the receiver of the memory controller.

In a possible implementation of this aspect, an address section of the NVM is configured for each of the at least two memory write instruction sets; and the cache controller of the memory controller is configured to:

determine a target address section in which the write address is located, and use a memory write instruction set associated with the target address section as the target memory write instruction set; and store the write instruction into the target memory write instruction set, and instruct the counter corresponding to the target memory write instruction set to decrease the credit value of the target memory write instruction set by 1.

In a possible implementation of this aspect, an address section of the NVM is configured for each of the at least two medium write instruction sets; and the cache controller of the medium controller is configured to:

determine the target address section in which the write address is located, and use a medium write instruction set associated with the target address section as the target medium write instruction set; and store the write instruction into the target medium write instruction set, and instruct the counter corresponding to the target medium write instruction set to decrease the credit value of the target medium write instruction set by 1.

In a possible implementation of this aspect, the cache controller of the memory controller is further configured to:

configure, by invoking a library function, the address section of each of the at least two memory write instruction sets, and configure the address section of each of the at least two medium write instruction sets, where the at least two memory write instruction sets and the at least two medium write instruction sets have a one-to-one mapping relationship, and a memory write instruction set and a medium write instruction set that are associated with each other have a same address section.

In a possible implementation of this aspect, the transmitter of the medium controller is configured to:

return, to the receiver of the memory controller according to a credit value query request sent by the transmitter of the memory controller, a query response that carries the credit value of the target medium write instruction set.

In a possible implementation of this aspect, the transmitter of the medium controller is configured to:

actively send the credit value of the target medium write instruction set periodically to the receiver of the memory controller.

In a possible implementation of this aspect, the cache controller of the memory controller is further configured to:

receive a persistence query instruction for the target memory write instruction set, and obtain a receiving moment of the persistence query instruction; block a write instruction that is to enter the target memory write instruction set after the receiving moment; read the credit value of the target memory write instruction set from the counter corresponding to the target memory write instruction set; and if the read credit value is equal to a preset maximum value, determine that persistence of the write instruction in the target memory write instruction set is completed.

In a possible implementation of this aspect, the cache controller of the medium controller is further configured to:

read, according to a received persistence query instruction for the target medium write instruction set, the credit value of the target medium write instruction set from the counter corresponding to the target medium write instruction set; and if the read credit value is equal to the preset maximum value, determine that a persistence operation of the write instruction in the target medium write instruction set is completed.

BRIEF DESCRIPTION OF DRAWINGS

The following briefly describes the accompanying drawings required for describing the embodiments.

DESCRIPTION OF EMBODIMENTS

The following clearly describes the technical solutions in the embodiments of the present invention with reference to the accompanying drawings in the embodiments of the present invention.

Figure 1:
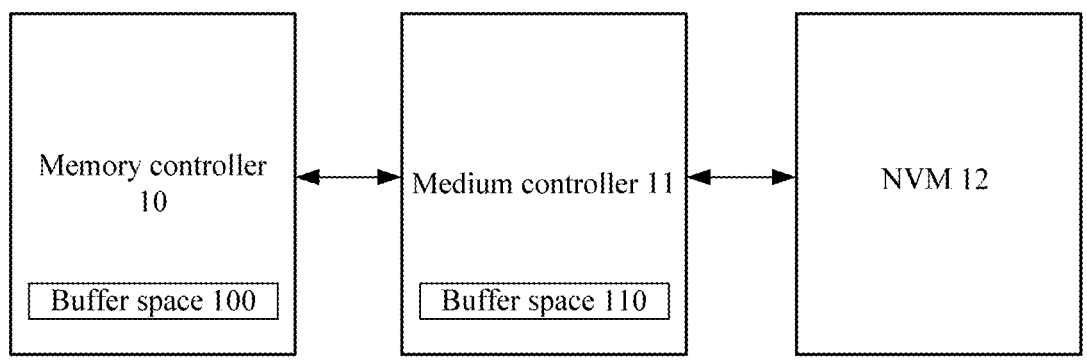
FIG. 1 is a schematic structural diagram of a computing device according to an embodiment of the present invention.

Referring to FIG. 1, FIG. 1 is a schematic structural diagram of a computing device according to an embodiment of the present invention. In this embodiment of the present invention, the computing device includes a memory controller 10, a medium controller 11, and an NVM 12, and the computing device includes but is not limited to a data center server, a network server, a video server, a gateway server, a personal computer, a mobile terminal, or the like. The NVM is a memory that can still retain data after a power failure occurs, and the NVM includes but is not limited to a ROM, a PROM, an EAROM, an EPROM, an EEPROM, or a flash memory.

The memory controller 10 is associated with at least two memory write instruction sets, and the at least two memory write instruction sets may be set in the memory controller. For example, the at least two memory write instruction sets are set in buffer space 100 of the memory controller. A credit value is configured for each of the at least two memory write instruction sets, and the credit value indicates a quantity of write instructions allowed to enter the memory write instruction set.

The medium controller 11 is associated with at least two medium write instruction sets, and the at least two medium write instruction sets may be set in the medium controller. For example, the at least two medium write instruction sets are located in buffer space 110. A credit value is configured for each of the at least two medium write instruction sets, and the credit value indicates a quantity of write instructions allowed to enter the medium write instruction set. A data structure of the memory write instruction set and the medium write instruction set may be a queue.

A quantity of memory write instruction sets in the at least two memory write instruction sets is equal to a quantity of medium write instruction sets in the at least two medium write instruction sets. It is assumed that the quantity of the memory write instruction sets is n, and the quantity of the medium write instruction sets is n, where n is an integer greater than 1. The n memory write instruction sets and the n medium write instruction sets have a one-to-one mapping relationship, and one memory write instruction set and one medium write instruction set have a binding relationship. In an initial state, each of the n memory write instruction sets has a maximum credit value, each of the n medium write instruction sets has a maximum credit value, and a memory write instruction set and a medium write instruction set that have a binding relationship have a same maximum credit value.

A working process of the computing device includes:

receiving, by the memory controller, a write instruction, where the write instruction includes a write address of to-be-written data;

determining, by the memory controller, a target memory write instruction set from the at least two memory write instruction sets based on the write address, storing the write instruction into the target memory write instruction set, and decreasing a credit value of the target memory write instruction set by a specified value;

sending, by the memory controller, the write instruction in the target memory write instruction set to the medium controller;

receiving, by the medium controller, the write instruction sent by the memory controller;

determining, by the medium controller, a target medium write instruction set from the at least two medium write instruction sets based on the write address, storing the write instruction into the target medium write instruction set, and decreasing a credit value of the target medium write instruction set by the specified value;

querying, by the medium controller based on a preset address mapping table, for a physical block address that is of the NVM and that is associated with the write address, and writing the to-be-written data corresponding to the write instruction into a physical block corresponding to the physical block address; and if no physical block address is found in the address mapping table, that is, if no physical block address is allocated, selecting, by the medium controller, a physical block from a free physical block list for allocation, and establishing, in the address mapping table, a mapping relationship between a physical block address of the selected physical block and the write address; and after the NVM successfully executes the write instruction, and writes the to-be-written data into the corresponding physical block, increasing, by the medium controller, the credit value of the target medium write instruction set by the specified value, that is, after confirming that the NVM completes persistence of the write instruction, restoring, by the medium controller, the credit value of the target medium write instruction set to a maximum value; sending, by the medium controller, the credit value of the target medium write instruction set to the memory controller; receiving, by the memory controller, the credit value that is of the target medium write instruction set and that is sent by the medium controller; and updating, by the memory controller, the credit value of the target memory write instruction set based on the credit value of the target medium write instruction set, so that the credit value of the target memory write instruction set and the credit value of the associated target medium write instruction set are kept synchronized.

In a possible implementation, a total address section of the NVM is divided into a plurality of non-overlapping address sections in advance. The quantity of the at least two memory write instruction sets associated with the memory controller is equal to a quantity of the plurality of address sections, and an address section is allocated to each memory write instruction set. Likewise, the quantity of the at least two medium write instruction sets associated with the medium controller is equal to the quantity of the plurality of address sections, and an address section is allocated to each medium write instruction set. In this way, when receiving the write instruction, the memory controller and the medium controller may determine, based on an address section within which the write address falls, the target memory write instruction set and the target medium write instruction set.

Three memory write instruction queues are set in the buffer space of the memory controller: a memory write instruction queue 1, a memory write instruction queue 2, and a memory write instruction queue 3. Three medium write instruction queues are set in the buffer space of the medium controller: a medium write instruction queue 1, a medium write instruction queue 2, and a medium write instruction queue 3. An address section allocated to the memory write instruction queue 1 and the medium write instruction queue 1 is 0x90000000 to 0x90ffffff, where 0x90000000 is a start address of the address section, and 0x90ffffff is an end address of the address section. An address section allocated to the memory write instruction queue 2 is 0x856000000 to 0x857fffff, where 0x856000000 is a start address, and 0x857fffff is an end address. An address section allocated to the memory write instruction queue 3 is 0x65600000 to 0x657fffff, where 0x65600000 is a start address, and 0x657fffff is an end address.

Through implementation of the foregoing embodiment, credit values respectively corresponding to the plurality of specified memory write instruction sets are kept synchronized with credit values respectively corresponding to the plurality of specified medium write instruction sets. The medium controller can determine an execution status of the write instruction based on the credit value of each medium write instruction set, and therefore after the credit values of the memory controller and the medium controller are kept synchronized, whether persistence of the write instruction is completed can be accurately found based on the credit values. In addition, setting the plurality of memory write instruction sets can implement local blocking at a granularity of a memory write instruction set during the persistence query, to improve parallel processing efficiency of the memory controller.

Referring to FIG. 2, FIG. 2 is a schematic flowchart of a non-volatile memory persistence method according to an embodiment of the present invention. In this embodiment of the present invention, the method includes the following steps.

S201. A memory controller receives a write instruction.

Specifically, the write instruction includes a write address of to-be-written data, and the write instruction may be sent by a processor. The memory controller may receive, by using an address bus, the write address sent by the processor, and receive, by using a data bus, the to-be-written data sent by the processor.

S202. The memory controller determines a target memory write instruction set from at least two memory write instruction sets based on a write address.

Specifically, the memory controller is associated with the at least two memory write instruction sets. The memory write instruction set is used to store the write instruction. A data structure of the memory write instruction set may be a queue, an array, a stack, or a linked list. The at least two memory write instruction sets may be set in the memory controller. For example, the at least two memory write instruction sets are set in buffer space of the memory controller. The memory controller determines the target memory write instruction set from the at least two memory write instruction sets based on the write address.

In a possible implementation, that the memory controller determines a target memory write instruction set from at least two memory write instruction sets based on a write address includes: dividing a total address section of the NVM into at least two address sections in advance, where a quantity of the divided address sections is equal to a quantity of the memory write instruction sets, and each of the at least two address sections is associated with one memory write instruction set; and determining, by the memory controller, an address section within which the write address falls, and using a memory write instruction set associated with the address section within which the write address falls as the target memory write instruction set.

Figure 2A:
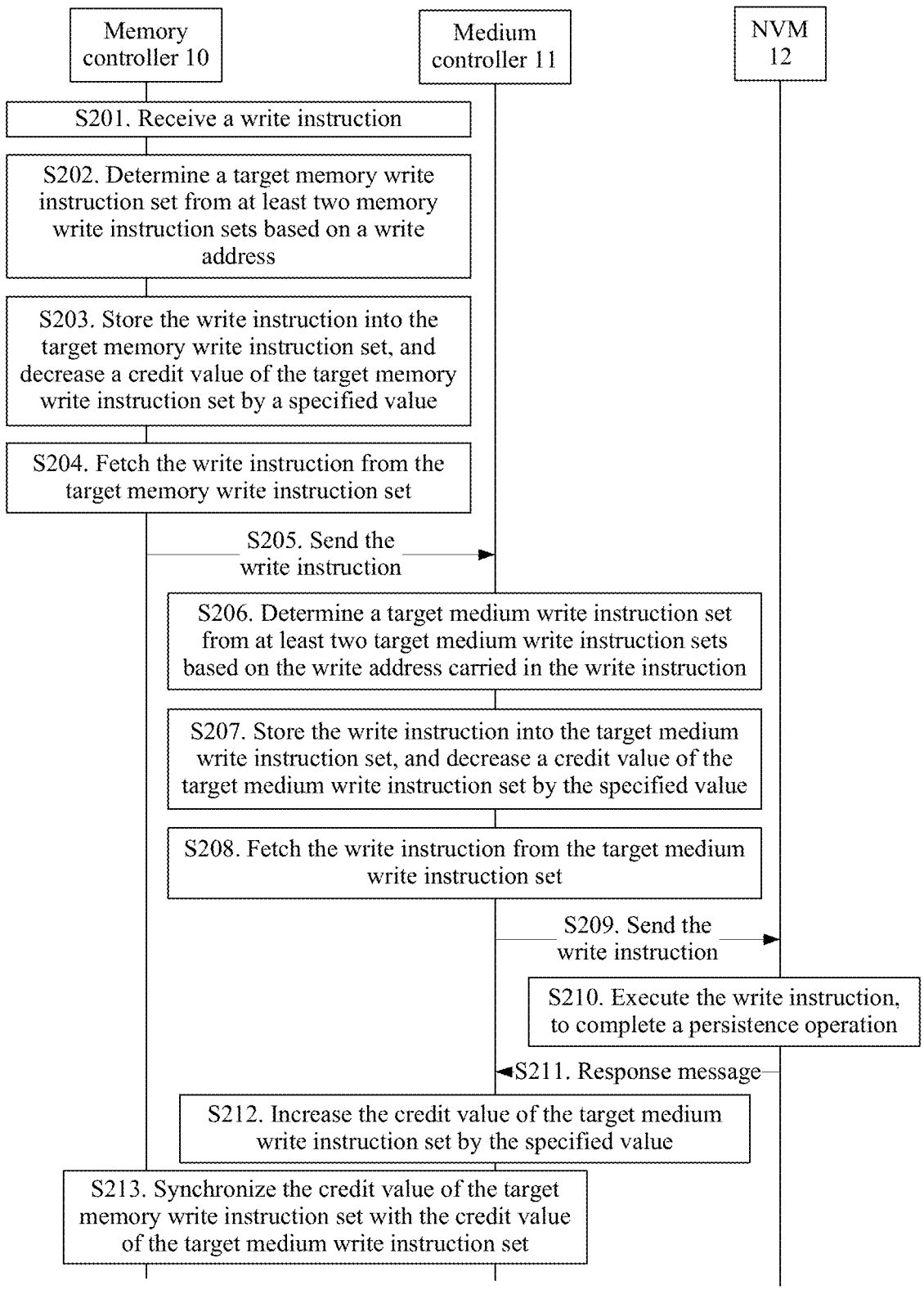
FIG. 2a is a schematic flowchart of an NVM persistence method according to an embodiment of the present invention.
Figure 2B:
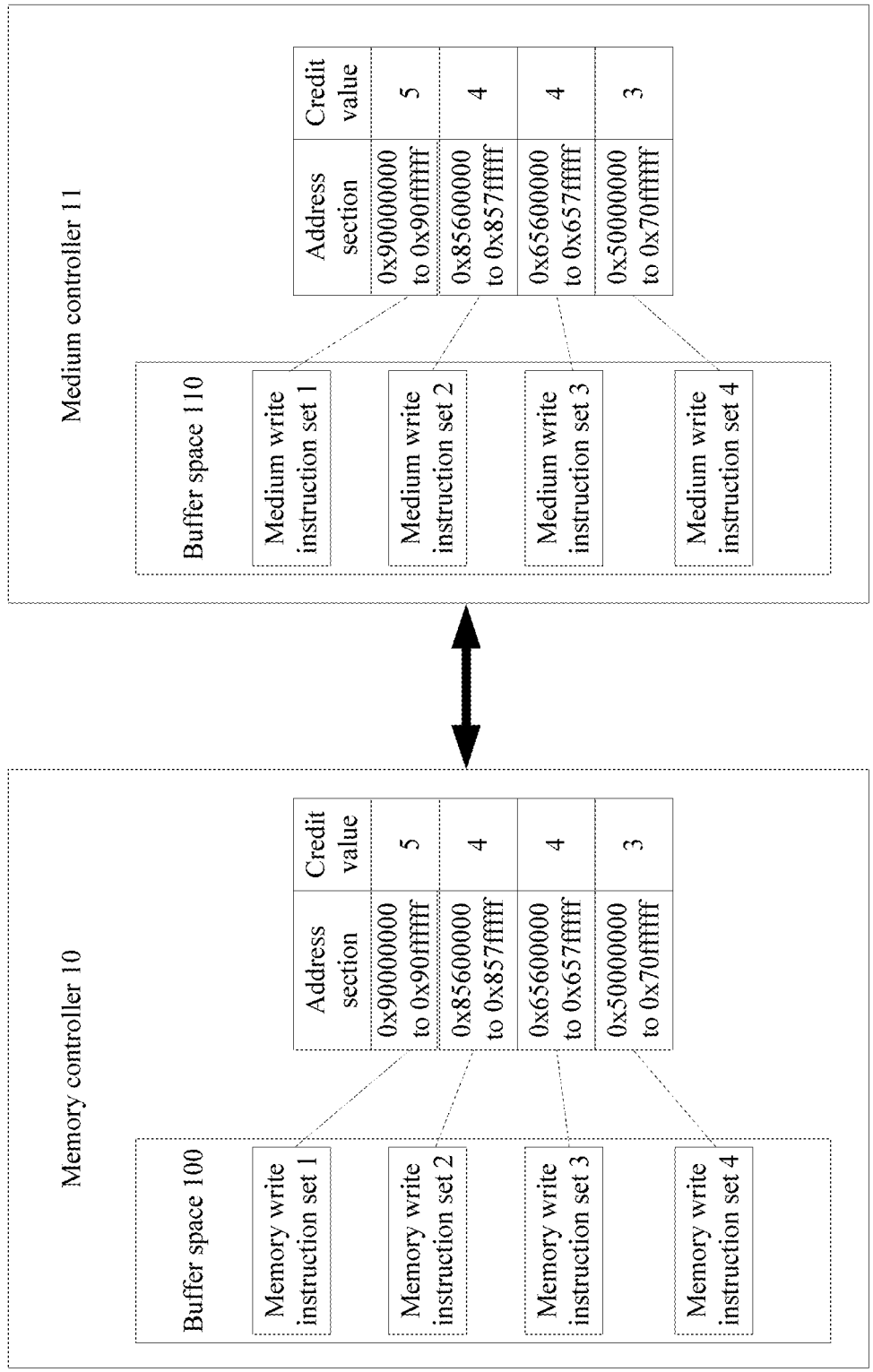
FIG. 2b to FIG. 2e are schematic diagrams of an adjustment principle of credit values of a memory controller and a medium controller according to an embodiment of the present invention.

For example, referring to FIG. 2b, a specified value is equal to 1, four memory write instruction sets are set in the memory controller: a memory write instruction set 1, a memory write instruction set 2, a memory write instruction set 3, and a memory write instruction set 4, corresponding to maximum credit values of 5, 4, 4, and 3, respectively; four medium write instruction sets are set in a medium controller: a medium write instruction set 1, a medium write instruction set 2, a medium write instruction set 3, and a medium write instruction set 4. The four memory write instruction sets and the four medium write instruction sets have a one-to-one mapping relationship. The mapping relationship is: the memory write instruction set 1 is associated with the medium write instruction set 1, the memory write instruction set 2 is associated with the medium write instruction set 2, the memory write instruction set 3 is associated with the medium write instruction set 3, the memory write instruction set 4 is associated with the medium write instruction set 4, and credit values of a memory write instruction set and a medium write instruction set that are associated with each other are equal. Address sections and credit values that are configured for the four memory write instruction sets and the four medium write instruction sets are shown in Table 1.

TABLE 1

| Memory write instruction set | Medium write instruction set | Credit value | Address section |
| --- | --- | --- | --- |
| Memory write instruction set 1 | Medium write instruction set 1 | 5 | 0x90000000 to 0x90ffffff |
| Memory write instruction set 2 | Medium write instruction set 2 | 4 | 0x85600000 to 0x857fffff |
| Memory write instruction set 3 | Medium write instruction set 3 | 4 | 0x65600000 to 0x657fffff |
| Memory write instruction set 4 | Medium write instruction set 4 | 3 | 0x50000000 to 0x70ffffff |

The memory controller receives the write instruction. It is assumed that the write instruction includes a write address 0x656033fe of the to-be-written data, and the memory controller determines, based on four address sections, an address section 0x65600000 to 0x657fffff within which the write address falls. The address section corresponds to the memory write instruction set 3, the memory write instruction set 3 is the target memory write instruction set, and the memory controller stores the write instruction into the memory write instruction set 3.

S203. The memory controller stores the write instruction into the target memory write instruction set, and decreases a credit value of the target memory write instruction set by a specified value.

Specifically, the credit value indicates a quantity of write instructions allowed to enter the target memory write instruction set. When the credit value of the target memory write instruction set is less than a preset value, no write instruction is allowed to enter the target memory write instruction set. The target memory write instruction set has a maximum credit value, and the maximum value indicates a maximum quantity of write instructions allowed to enter the target memory write instruction set. The memory controller stores the write instruction into the target memory write instruction set. For example, if a data structure of the target memory write instruction set is a queue, the memory controller stores the write instruction at the tail of the queue of the target memory write instruction set; or if a data structure of the target memory write instruction set is a stack, the memory controller stores the write instruction at the top of the stack of the target memory write instruction set. The memory controller stores the write instruction into the target memory write instruction set, and then decreases the credit value of the memory write instruction set by the specified value. A specific value of the specified value is not limited, and may be set as required.

Figure 2C:
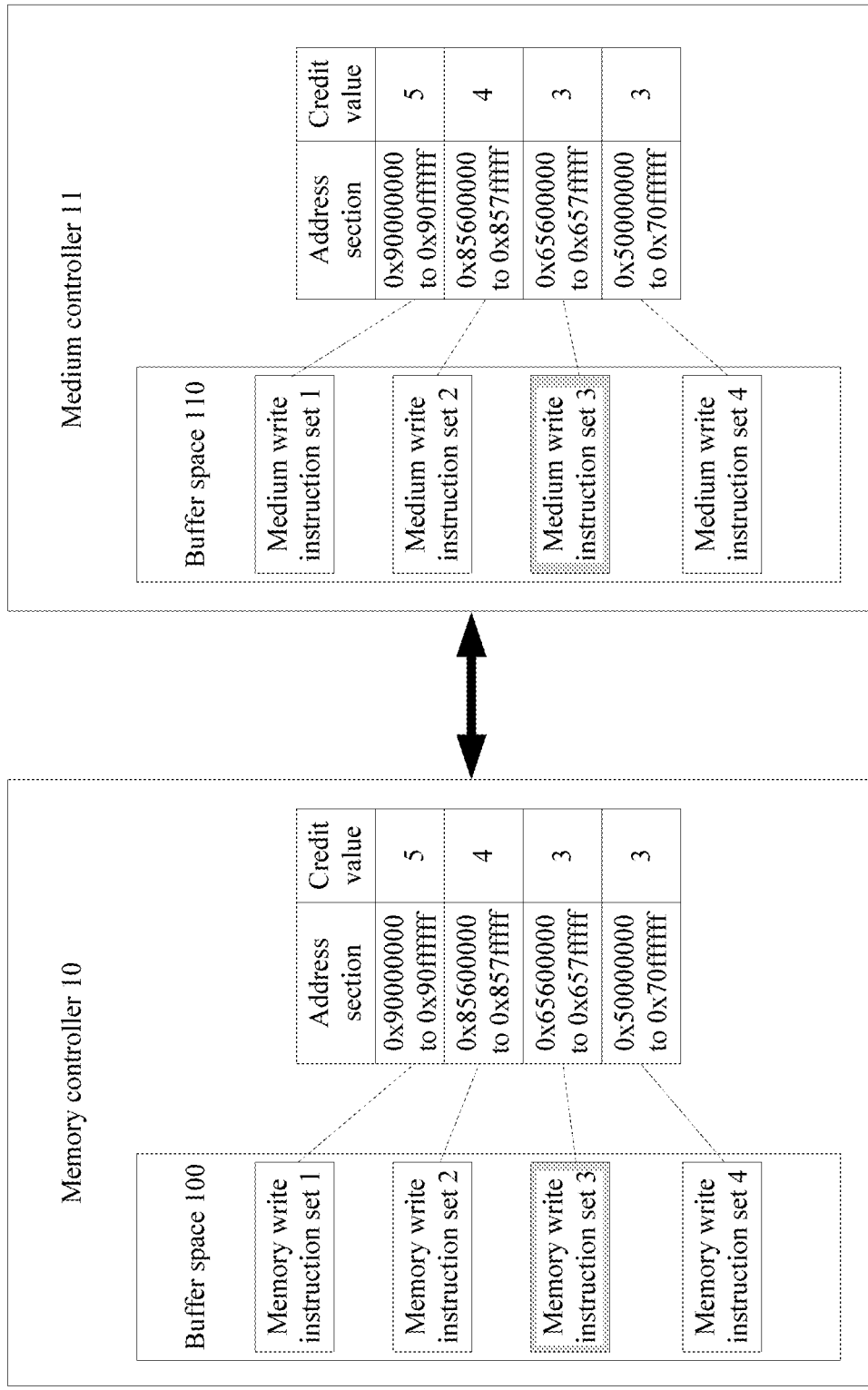

As a continuation of the foregoing example, referring to FIG. 2c, the memory controller decreases a credit value of 4 of the memory write instruction set 3 by 1, and an updated credit value of the memory write instruction set 3 is 3.

S204. The memory controller fetches the write instruction from the target memory write instruction set.

Specifically, the memory controller may select a memory write instruction set from the at least two memory write instruction sets according to a preset selection rule. When the selected memory write instruction set is the target memory write instruction set in S203, and when the write instruction in S203 comes to a fetching moment, the memory controller fetches the write instruction from the target memory write instruction set. The selection rule may be: random selection, polling based on a number of the memory write instruction set, polling based on a priority of the memory write instruction set, or the like.

S205. The memory controller sends the write instruction to a medium controller.

The write instruction carries the write address of the to-be-written data.

S206. The medium controller determines a target medium write instruction set from at least two medium write instruction sets based on the write address carried in the write instruction.

Specifically, the medium write instruction set is used to store the write instruction. A data structure of the medium write instruction set includes but is not limited to a queue, a linked list, an array, or a stack, and the at least two medium write instruction sets may be set in the medium controller. For example, the at least two medium write instruction sets are set in buffer space of the medium controller. The medium controller determines the target medium write instruction set from the at least two medium write instruction sets based on the write address carried in the write instruction.

In a possible implementation, a method for determining the target medium write instruction set by the medium controller may be: dividing the total address section of the NVM into at least two consecutive and non-overlapping address sections, where each of the at least two address sections is associated with one medium write instruction set, the quantity of medium write instruction sets in the at least two medium write instruction sets is equal to the quantity of memory write instruction sets in the at least two memory write instruction sets, and address sections configured for a memory write instruction set and a medium write instruction set that are associated with each other are the same; and determining, by the medium controller, an address section within which the write address falls, and using a medium write instruction set corresponding to the section within which the write address falls as the target medium write instruction set.

As a continuation of the foregoing example, referring to FIG. 2c, the memory controller fetches the write instruction from the memory write instruction set 3, and sends the write instruction to the medium controller. The medium controller determines, based on the write address 0x656033fe of the write instruction, the address section 0x65600000 to 0x657fffff within which the write address falls. The address section corresponds to the medium write instruction set 3, the medium write instruction set 3 is the target medium write instruction set, and the medium controller stores the write instruction into the medium write instruction set 3.

S207. The medium controller stores the write instruction into the target medium write instruction set, and decreases a credit value of the target medium write instruction set by the specified value.

Specifically, the credit value indicates a quantity of write instructions allowed to enter the target medium write instruction set. When the credit value of the target medium write instruction set is less than the preset value, no write instruction is allowed to enter the target medium write instruction set. The target medium write instruction set has a maximum credit value, and the maximum value indicates a maximum quantity of write instructions allowed to enter the target medium write instruction set. Because maximum credit values of a memory write instruction set and a medium write instruction set that have an association relationship are equal, maximum credit values of the target memory write instruction set and the target medium write instruction set are equal. A data structure of the target medium write instruction set includes but is not limited to an array, a linked list, a queue, or a stack. The medium controller stores the write instruction into the target medium write instruction set, and then decreases the credit value of the target medium write instruction set by the specified value. A specific value of the specified value is not limited, and may be set as required.

As a continuation of the foregoing example, referring to FIG. 2c, the medium controller stores the write instruction into the medium write instruction set 3, the medium controller decreases a credit value of 4 of the medium write instruction set 3 by 1, and an updated credit value of the medium write instruction set 3 is 3.

S208. The medium controller fetches the write instruction from the target medium write instruction set.

Specifically, the medium controller may select one medium write instruction set from the at least two medium write instruction sets according to a preset selection rule. When the selected medium write instruction set is the target medium write instruction set in S207, and when it comes to a moment for fetching the write instruction in the target medium write instruction set in S207, the medium controller fetches the write instruction from the target medium write instruction set. The selection rule for selecting a medium write instruction set from the at least two medium write instruction sets may be: random selection, polling based on a number of the medium write instruction set, or polling based on a priority of the medium write instruction set.

S209. The medium controller sends the write instruction to an NVM.

Specifically, the medium controller obtains the write address carried in the write instruction, and converts the write address into a physical block address based on a preset address mapping table, and the medium controller sends, to the NVM, the write instruction that carries the physical block address.

S210. The NVM executes the write instruction, to complete a persistence operation.

Specifically, the NVM writes the to-be-written data into a physical block to which the physical block address points, and after the to-be-written data is written, the persistence operation is completed.

S211. The NVM returns a response message to the medium controller, where the response message is used to notify the medium controller that the persistence operation of the write instruction is completed on the NVM.

S212. The medium controller increases the credit value of the target medium write instruction set by the specified value.

When determining that the persistence operation of the write instruction is completed on the NVM, the medium controller increases the credit value of the target medium write instruction set by the specified value. In this way, after S207 in which the write instruction enters the target medium write instruction set and then the credit value is decreased by the specified value, and after the persistence operation of the write instruction is completed and then the credit value of the target medium write instruction set is increased by the specified value, the credit value of the target medium write instruction set is restored to a maximum value.

Figure 2D:
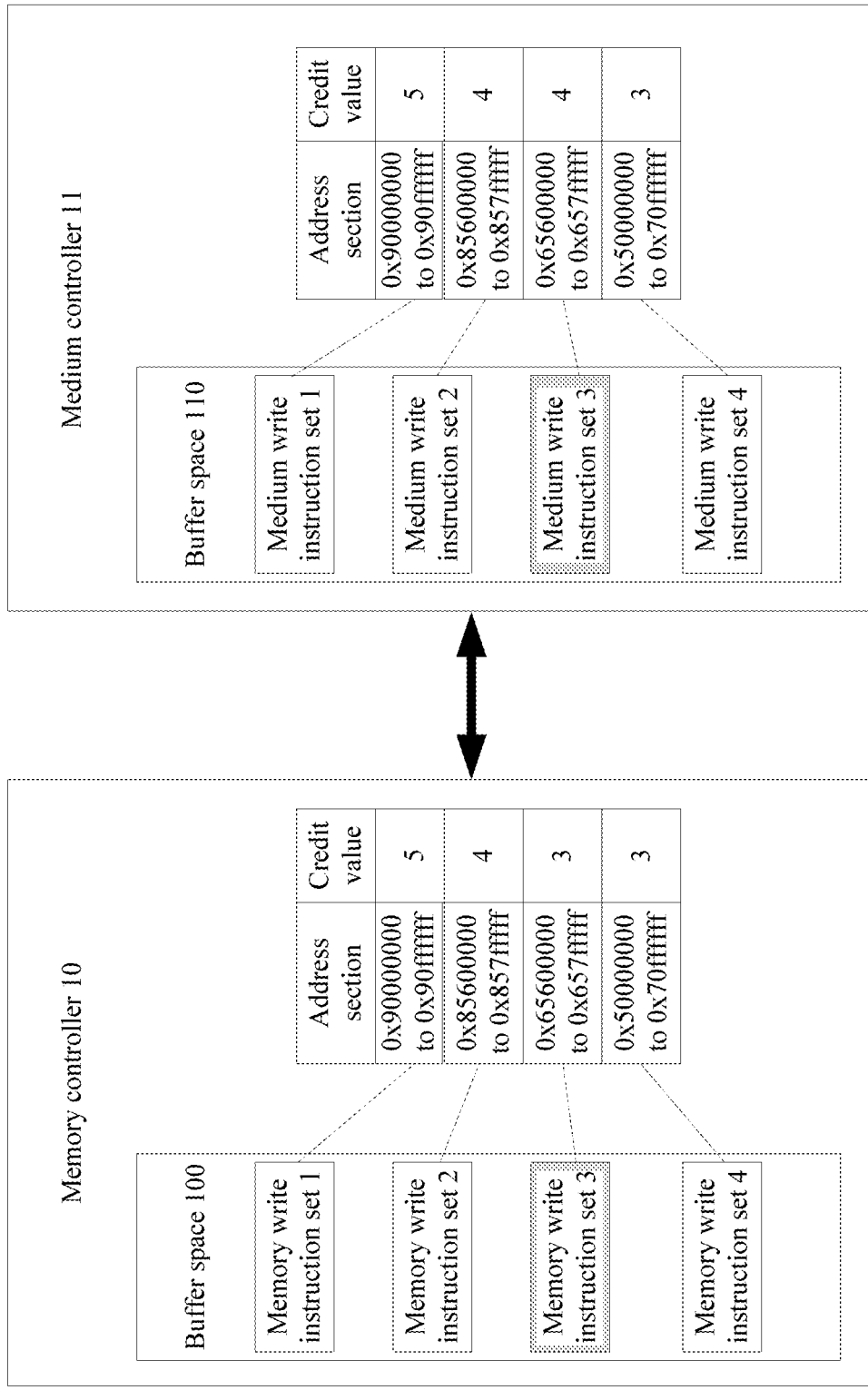

As a continuation of the foregoing example, referring to FIG. 2d, the medium controller fetches the write instruction from the medium write instruction set 3, and sends the write instruction to the NVM. The NVM maps the write address to a physical block address based on the preset address mapping table, and writes the to-be-written data into a physical block corresponding to the physical block address. After the NVM successfully writes the to-be-written data into the physical block to complete the persistence operation, the NVM may return the response message to the medium controller. After determining that the persistence operation of the write instruction is completed, the medium controller increases the credit value of the medium write instruction set 3 by 1, and then the credit value of the medium write instruction set 3 becomes 4.

S213. Synchronize the credit value of the target memory write instruction set with the credit value of the target medium write instruction set.

Specifically, a method for synchronizing the credit values may be: actively querying, by the memory controller, for the medium controller about the credit value of the target medium write instruction set based on a preset period, where the credit value of the target medium write instruction set may be stored in a register of the medium controller, and the memory controller updates, based on the found credit value, the credit value of the target memory write instruction set; or actively notifying, by the medium controller, the memory controller that the credit value of the target medium write instruction set is updated, so that the memory controller updates the credit value of the target memory write instruction set based on the notified credit value; or adding the credit value of the target medium write instruction set to the response message of the write instruction.

Figure 2E:
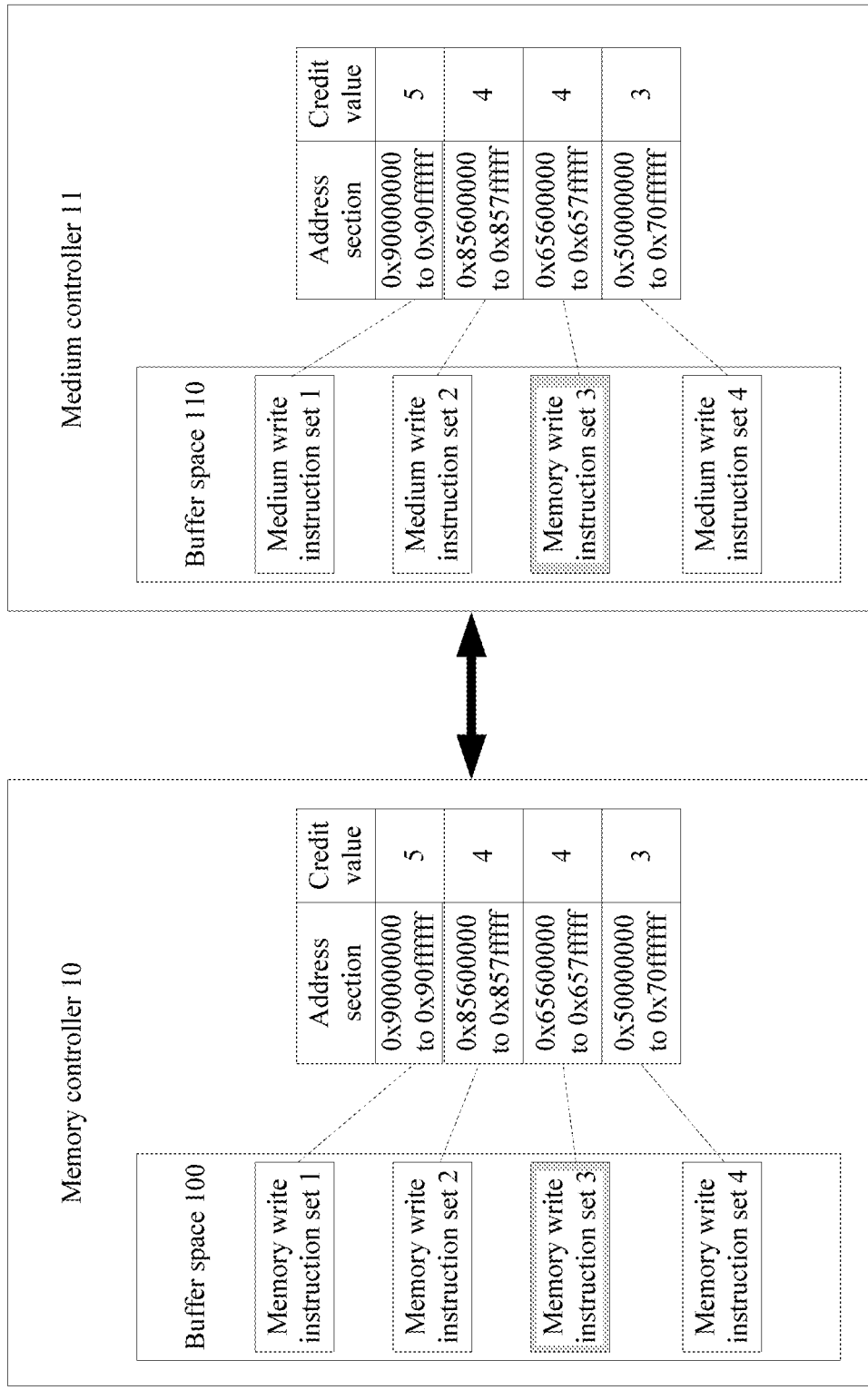

As a continuation of the foregoing example, referring to FIG. 2e, the medium controller sends the updated credit value of 4 of the medium write instruction set 3 to the memory controller, and the memory controller updates the credit value of the memory write instruction set 3 to 4 based on the credit value of 4 of the medium write instruction set 3.

Optionally, if the preset specified value is 1, after determining the target memory write instruction set, the memory controller obtains a current credit value of the target memory write instruction set, and determines whether the current credit value is greater than 0; and if a determining result is that the current credit value is greater than 0, stores the write instruction into the target memory write instruction set; or if the determining result is that the current credit value is 0, caches the write instruction, queries for the credit value of the target memory write instruction set based on the preset period, and when finding that the credit value of the target memory write instruction set is greater than 0, stores the cached write instruction into the target memory write instruction set. In the foregoing embodiment, a quantity of write instructions that enter the memory controller is controlled by using the credit value, to avoid overload caused because the memory controller cannot process the write instructions in a timely manner.

Optionally, after determining the target medium write instruction set, the medium controller obtains a current credit value of the target medium write instruction set, and determines whether the current credit value is greater than 0; and if a determining result is that the current credit value is greater than 0, stores the write instruction into the target medium write instruction set; or if the determining result is that the current credit value is not greater than 0, caches the write instruction, queries for the credit value of the target memory write instruction set based on the preset period, and when finding that the credit value of the target medium write instruction set is greater than 0, stores the cached write instruction into the target medium write instruction set. In the foregoing embodiment, a quantity of write instructions that enter the medium controller is controlled by using the credit value, to avoid overload caused because the medium controller cannot process the write instructions in a timely manner.

Optionally, the non-volatile memory persistence method of this application further includes:

receiving, by the memory controller, a persistence query instruction for the target memory write instruction set, and obtaining a receiving moment of the persistence query instruction;

blocking, by the memory controller after the receiving moment, a write instruction that is to enter the target memory write instruction set;

reading, by the memory controller, the credit value of the target memory write instruction set; and if the read credit value is equal to the preset maximum value, determining, by the memory controller, that persistence of the write instruction in the target memory write instruction set is completed.

Specifically, the memory controller receives the persistence query instruction for the target memory write instruction set. The persistence query instruction may be sent by a processor, and the persistence query instruction may be a CPU instruction or a call function. The CPU instruction or the call function carries an identifier of the target memory write instruction set. After the receiving moment of receiving the persistence query instruction, the memory controller blocks, a write instruction that is to enter the target memory write instruction set. The memory controller does not perform a blocking operation on another memory write instruction set that is different from the target memory write instruction set in the at least two target memory write instruction sets. The memory controller reads the credit value of the target memory write instruction set. If the read credit value is equal to the preset maximum value, it indicates that no write instruction in the target memory write instruction set occupies a credit value, and the persistence operation of the write instruction in the target memory write instruction set is completed.

As a continuation of the foregoing example, referring to FIG. 2e, when the memory controller receives the persistence query instruction for the memory write instruction set 3, the memory controller obtains a receiving moment t0 of the persistence query instruction, and the memory controller blocks a write instruction that is to enter the memory write instruction set 3 after the moment t0. A blocking method may be: caching the write instruction that is to enter the memory write instruction set 3 after the moment t0; or adding a soft mutex to the memory write instruction set 3, where a write instruction can still normally enter the memory write instruction sets 1, 2, and 4. When the memory controller obtains the credit value of the memory write instruction set 3, and finds that the credit value of the memory write instruction set 3 is equal to a maximum value of 4, the memory controller determines that no write instruction in the memory write instruction set 3 occupies a credit value, and the persistence operation of the memory write instruction set 3 is completed.

For another example, when the medium controller receives a persistence query instruction for the medium write instruction set 3, obtains a credit value of the medium write instruction set 3, and finds that the credit value of the medium write instruction set 3 is equal to the maximum value of 4, no write instruction in the medium write instruction set 3 occupies a credit value, and a persistence operation of the write instruction in the medium write instruction set 3 is completed.

Optionally, the blocking, by the memory controller after the receiving moment, a write instruction that is to enter the target memory write instruction set includes:

caching, by the memory controller after the receiving moment, the write instruction that is to enter the target memory write instruction set; or adding, by the memory controller, a software mutex to the target memory write instruction set at the receiving moment.

Specifically, a method for blocking, by the memory controller after the receiving moment, a write instruction that is to enter the target memory write instruction set includes: caching, by the memory controller after the receiving moment, the write instruction that is to enter the target memory write instruction set, and when determining that the credit value of the target memory write instruction set is equal to the preset maximum value, sending, by the memory controller, the cached write instruction to the target memory write instruction set; or adding, by the memory controller, a soft mutex to the target memory write instruction set, to block the write instruction that is to enter the target memory write instruction set.

Optionally, the non-volatile memory persistence method of this application further includes:

receiving, by the medium controller, a persistence query instruction for the target medium write instruction set;

reading, by the medium controller, the credit value of the target medium write instruction set; and if the read credit value is equal to the preset maximum value, determining, by the medium controller, that a persistence operation of the write instruction in the target medium write instruction set is completed.

Specifically, the medium controller receives the persistence query instruction for the target medium write instruction set, where the persistence query instruction may be sent by a processor, the persistence query instruction may be a CPU instruction or a call function, and the CPU instruction or the call function carries an identifier of the target medium write instruction set. The medium controller reads the credit value of the target medium write instruction set, and if the read credit value is equal to the preset maximum value, it indicates that no write instruction in the target medium write instruction set occupies a credit value, and the persistence operation of the write instruction in the target medium write instruction set is completed.

In the foregoing embodiment, credit values respectively corresponding to the plurality of specified memory write instruction sets are kept synchronized with credit values respectively corresponding to the plurality of specified medium write instruction sets. The medium controller can determine an execution status of the write instruction based on the credit value of each medium write instruction set, and therefore after the credit values of the memory controller and the medium controller are kept synchronized, whether persistence of the write instruction is completed can be accurately found based on the credit values. In addition, setting the plurality of memory write instruction sets can implement local blocking at a granularity of a memory write instruction set during the persistence query, to improve parallel processing efficiency of the memory controller.

Figure 3:
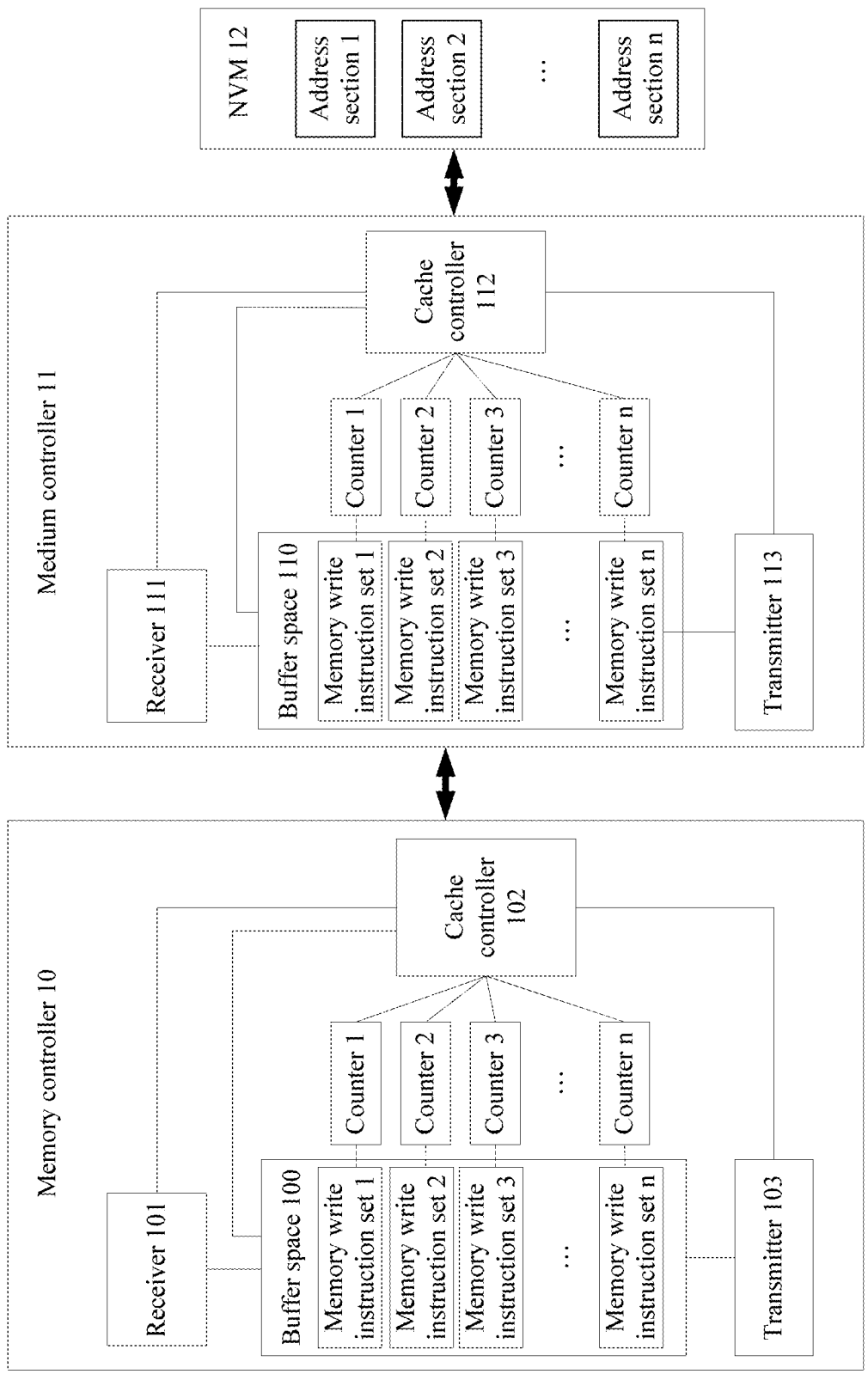
FIG. 3 is another schematic structural diagram of a computing device according to an embodiment of the present invention.

Referring to FIG. 3, FIG. 3 is another schematic structural diagram of a computing device according to an embodiment of this application. In this embodiment, the computing device includes a memory controller 10, a medium controller 11, and an NVM 12. The memory controller 10 includes buffer space 100, a receiver 101, a cache controller 102, n counters, and a transmitter 103, where n memory write instruction sets are set in the buffer space 100, one counter is configured for each memory write instruction set, and n is an integer greater than 1.

The medium controller 11 includes buffer space 110, a receiver 111, a cache controller 112, n counters, and a transmitter 113, where n medium write instruction sets are set in the buffer space 110, and one counter is configured for each medium write instruction set.

A total address section of the NVM 12 is divided into n address sections, the n memory write instruction sets and the n address sections have a one-to-one mapping relationship, and the n medium write instruction sets and the n address sections have a one-to-one mapping relationship.

It should be noted that components included in the memory controller 10 and the medium controller 11 may be implemented by using an application-specific integrated circuit (ASIC), or may be implemented by using a programmable logic device (PLD). The PLD may be a complex programmable logic device (CPLD), an FPGA, or a generic array logic (GAL), or any combination thereof.

A working process of the computing device includes:

the receiver 101 of the memory controller 10 is configured to receive a write instruction that carries a write address;

the cache controller 102 of the memory controller 10 is configured to: select, based on the write address, a target memory write instruction set from the at least two memory write instruction sets stored in the buffer space of the memory controller, store the write instruction into the target memory write instruction set, and instruct a counter corresponding to the target memory write instruction set to decrease a credit value of the target memory write instruction set by a specified value;

the transmitter 103 of the memory controller 10 is configured to send the write instruction in the target memory write instruction set to the receiver of the medium controller;

the receiver 101 of the memory controller 10 is further configured to receive a credit value that is of a target medium write instruction set and that is sent by the transmitter of the medium controller;

the cache controller 102 of the memory controller 10 is further configured to instruct a counter corresponding to the memory controller to update the credit value of the target memory write instruction set based on a credit value of the target medium write instruction set;

the receiver 111 of the medium controller 11 is configured to receive the write instruction sent by the transmitter of the memory controller;

the cache controller 112 of the medium controller 11 is configured to: determine, based on the write address, the target medium write instruction set from the at least two medium write instruction sets stored in the buffer space of the medium controller, store the write instruction into the target medium write instruction set, and instruct a counter corresponding to the target medium write instruction set to decrease the credit value of the target medium write instruction set by the specified value;

the transmitter 113 of the medium controller 11 is configured to send the write instruction in the target medium write instruction set to the NVM 12;

the cache controller 112 of the medium controller 11 is further configured to: after the NVM successfully executes the write instruction, instruct the counter corresponding to the target medium write instruction set to increase the credit value of the target medium write instruction set by the specified value; and the transmitter 113 of the medium controller 11 is further configured to send the credit value of the target medium write instruction set to the receiver of the memory controller.

In a possible implementation, an address section of the NVM is configured for each of the at least two memory write instruction sets.

The cache controller 102 of the memory controller 10 is configured to:

determine a target address section in which the write address is located, and use a memory write instruction set associated with the target address section as the target memory write instruction set; and store the write instruction into the target memory write instruction set, and instruct the counter corresponding to the target memory write instruction set to decrease the credit value of the target memory write instruction set by 1.

In a possible implementation, an address section of the NVM is configured for each of the at least two medium write instruction sets.

The cache controller 112 of the medium controller 11 is configured to:

determine the target address section in which the write address is located, and use a medium write instruction set associated with the target address section as the target medium write instruction set; and store the write instruction into the target medium write instruction set, and instruct the counter corresponding to the target medium write instruction set to decrease the credit value of the target medium write instruction set by 1.

In a possible implementation, the cache controller 102 of the memory controller 10 is further configured to:

configure, by invoking a library function, the address section of each of the at least two memory write instruction sets, and configure the address section of each of the at least two medium write instruction sets, where the at least two memory write instruction sets and the at least two medium write instruction sets have a one-to-one mapping relationship, and a memory write instruction set and a medium write instruction set that are associated with each other have a same address section.

In a possible implementation, the transmitter 113 of the medium controller 11 is configured to:

return, to the receiver of the memory controller according to a credit value query request sent by the transmitter of the memory controller, a query response that carries the credit value of the target medium write instruction set.

In a possible implementation, the transmitter 113 of the medium controller 11 is configured to:

actively send the credit value of the target medium write instruction set periodically to the receiver of the memory controller.

In a possible implementation, the cache controller 102 of the memory controller 10 is further configured to:

receive a persistence query instruction for the target memory write instruction set, and obtain a receiving moment of the persistence query instruction; block a write instruction that is to enter the target memory write instruction set after the receiving moment; read the credit value of the target memory write instruction set from the counter corresponding to the target memory write instruction set; and if the read credit value is equal to a preset maximum value, determine that persistence of the write instruction in the target memory write instruction set is completed.

In a possible implementation, the cache controller 112 of the medium controller 11 is further configured to:

read, according to a received persistence query instruction for the target medium write instruction set, the credit value of the target medium write instruction set from the counter corresponding to the target medium write instruction set; and if the read credit value is equal to the preset maximum value, determine that a persistence operation of the write instruction in the target medium write instruction set is completed.

In the foregoing embodiment, credit values respectively corresponding to the plurality of specified memory write instruction sets are kept synchronized with credit values respectively corresponding to the plurality of specified medium write instruction sets. The medium controller can determine an execution status of the write instruction based on the credit value of each medium write instruction set, and therefore after the credit values of the memory controller and the medium controller are kept synchronized, whether persistence of the write instruction is completed can be accurately found based on the credit values. In addition, setting the plurality of memory write instruction sets can implement local blocking at a granularity of a memory write instruction set during the persistence query, to improve parallel processing efficiency of the memory controller.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, a compact disc, a read-only memory (ROM), or a random access memory (RAM).

What is disclosed above is merely embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A method for confirming completion of writing data into a non-volatile memory (NVM), comprising:
receiving, by a memory controller from a central processing unit (CPU), a persistence query comprising an identifier of a first memory write instruction set in a plurality of memory write instructions sets maintained by the memory controller, wherein the first memory write instruction set contains multiple write instructions;
receiving, by the memory controller from the CPU subsequent to receiving the persistence query, a first new write instruction to be buffered in the first memory write instruction set and a second new write instruction to be buffered in a second memory write instruction set that is different from the first memory write instruction set identified by the persistence query;
blocking, by the memory controller, the first new write instruction by not adding the first new write instruction into the first memory write instruction set;
adding, by the memory controller, the second new write instruction to the second memory write instruction set;
sending, by the memory controller, the multiple write instructions in the first memory write instruction set to a medium controller of the NVM to write data of the multiple write instructions into the NVM;
confirming, by the memory controller, that the data of the multiple write instructions have been written into the NVM by the medium controller; and
in response to the confirming, reopening, by the memory controller, the first memory write instruction set by adding a third new write instruction into the first memory write instruction set.

2. The method of the claim 1, further comprising:
receiving, by the medium controller from the memory controller, the multiple write instructions of the first memory write instruction set;
buffering, by the medium controller, the multiple write instructions to a first medium write instruction set in a plurality of medium write instruction sets corresponding to the plurality of memory write instruction sets;
writing, by the medium controller, the data in the multiple write instructions to the NVM; and
updating, by the medium controller, a credit value of the first medium write instruction set, wherein the credit value being indicative of a quantity of completed write instructions.

3. The method of the claim 2, further comprising:
sending, by the medium controller, the credit value to the memory controller;
wherein the process of confirming by the memory controller comprises determining according to the credit value that the data of the multiple write instructions have been written into the NVM.

4. The method of the claim 2, wherein each memory write instruction set and a corresponding medium write instruction set are associated with an address section of the NVM.

5. The method of the claim 4, wherein the first memory write instruction set is associated with a first address section of the NVM, and wherein write addresses of the multiple write instructions belong to the first address section.

6. The method of the claim 3, wherein each of the memory write instruction sets and the medium write instruction sets has a credit value, and the method further comprises:
updating, by the memory controller, a credit value of the first memory write instruction set according to the received credit value of the first medium write instruction set, wherein the credit value of the first memory write instruction set is indicative of the quantity of completed write instructions.

7. A computer system, comprising:
a central processing unit (CPU);
a non-volatile memory (NVM);
a medium controller coupled to the NVM;
a memory controller coupled to the medium controller and configured to:

receive, from the CPU, a persistence query comprising an identifier of a first memory write instruction set in a plurality of memory write instruction sets maintained by the memory controller, wherein the first write instruction set contains multiple write instructions;

receive, from the CPU subsequent to receiving the persistence query, a first new write instruction to be buffered in the first memory write instruction set and a second new write instruction to be buffered in a second memory write instruction set that is different from the first write instruction set identified by the persistence query;

block the first new write instruction by not adding the first new write instruction into the first memory write instruction set;

add the second new write instruction to the second memory write instruction set;

send the multiple write instructions in the first memory write instruction set to a medium controller of the NVM to write data of the multiple write instructions into the NVM;

confirm that the data of the multiple write instructions have been written into the NVM by the medium controller; and in response to confirming that the data of the multiple write instructions have been written into the NVM, reopen the first memory write instruction set by adding a third new write instruction into the first memory write instruction set.

8. The computer system of the claim 7, wherein the medium controller is configured to:

receive the multiple write instructions from the memory controller;

buffer the multiple write instructions to a first medium write instruction set in a plurality of medium write instructions sets;

write the data in the multiple write instructions to the NVM; and update a credit value of the first medium write instruction set, wherein the credit value indicates a quantity of completed write instructions.

9. The computer system of the claim 8, wherein the medium controller is further configured to send the credit value to the memory controller, and:

the memory controller is configured to confirm that the data of the multiple write instructions of the first memory write instruction set are written into the NVM according to the credit value received from the medium controller.

10. The computer system of the claim 8, wherein each memory write instruction set and a corresponding medium write instruction set are associated with an address section of the NVM.

11. The computer system of the claim 10, wherein the first memory write instruction set is associate with a first address section of the NVM, and write addresses of the multiple write instructions of the first memory write instruction set belong to the first address section.

12. The computer system of the claim 9, wherein each of the memory write instruction sets and the medium write instruction sets has a credit value, and wherein the memory controller is further configured to:

update a credit value of the first memory write instruction set according to the received credit value of the first medium write instruction set, wherein the credit value of the first memory write instruction set indicates the quantity of completed write instructions.

* * * * *